United States Patent [19]

Grasel et al.

[11] Patent Number: 5,104,909
[45] Date of Patent: Apr. 14, 1992

[54] WATER-ABSORBENT, HIGH CAPACITY POLYURETHANE FOAMS

[75] Inventors: Timothy G. Grasel, Laurel; James L. Guthrie, Ashton, both of Md.

[73] Assignee: W. R. Grace & Co.-Conn., New York, N.Y.

[21] Appl. No.: 410,458

[22] Filed: Sep. 21, 1989

[51] Int. Cl.$^5$ ............................................. C08G 18/14
[52] U.S. Cl. .................................. 521/159; 521/51; 521/123; 521/126; 521/127; 521/160; 528/53
[58] Field of Search ............... 521/159, 123, 126, 127, 521/51, 160; 528/53

[56] References Cited

U.S. PATENT DOCUMENTS

| | | | |
|---|---|---|---|
| 3,790,508 | 2/1974 | Triolo | 521/60 |
| 3,812,618 | 5/1974 | Wood et al. | 521/102 |
| 3,812,619 | 5/1974 | Wood et al. | 521/78 |
| 3,833,386 | 9/1974 | Wood et al. | 521/77 |
| 3,903,232 | 9/1975 | Wood et al. | 521/159 |
| 3,939,123 | 2/1976 | Matthews et al. | 528/60 |
| 3,959,191 | 2/1976 | Kehr et al. | 521/128 |
| 4,049,592 | 9/1977 | Marans et al. | 521/159 |
| 4,110,508 | 8/1978 | Isgur et al. | 428/240 |
| 4,127,516 | 11/1978 | Larsen et al. | 521/137 |
| 4,132,839 | 1/1979 | Marans et al. | 521/159 |
| 4,160,076 | 4/1979 | Guthrie et al. | 521/116 |
| 4,201,846 | 5/1980 | Kehr et al. | 521/137 |
| 4,314,034 | 2/1982 | Fulmer et al. | 521/65 |
| 4,357,430 | 11/1982 | VanCleve | 521/128 |
| 4,377,645 | 3/1983 | Guthrie et al. | 521/137 |
| 4,384,050 | 5/1983 | Guthrie | 521/137 |
| 4,384,051 | 5/1983 | Guthrie | 521/137 |
| 4,385,133 | 5/1983 | Alberino et al. | 521/159 |
| 4,638,017 | 1/1987 | Larson et al. | 521/157 |
| 4,657,006 | 4/1987 | Rawlings et al. | 128/156 |
| 4,666,439 | 5/1987 | Williams et al. | 604/368 |
| 4,725,627 | 2/1988 | Arnason et al. | 521/159 |
| 4,725,628 | 2/1988 | Garvey et al. | 521/137 |
| 4,725,629 | 2/1988 | Garvey et al. | 521/137 |
| 4,738,992 | 4/1988 | Larson et al. | 521/157 |
| 4,747,401 | 5/1988 | Potter et al. | 128/156 |
| 4,798,876 | 1/1989 | Gould et al. | 525/457 |

OTHER PUBLICATIONS

*Non wovens Markets,* "Super Absorbents", p. 3, —Jul. 14, 1989.

Primary Examiner—John Kight, III
Assistant Examiner—Dvc Truong
Attorney, Agent, or Firm—Valerie E. Looper; Steven T. Trinker

[57] ABSTRACT

A water absorbent, relatively dimensionally stable foam is formed from a prepolymer prepared from a polyoxyethylene containing diol, a crosslinking agent and a polyisocyanate. The preferred polyisocyanate is methylene bis(cyclohexyl isocyanate). The foam also demonstrates the ability to hold substantial amounts of water, even under pressure, and can be used in various personal and medical care products such as diapers and surgical sponges.

38 Claims, No Drawings

WATER-ABSORBENT, HIGH CAPACITY POLYURETHANE FOAMS

BACKGROUND OF THE INVENTION

1. Field of the Invention

Generally, the invention relates to urethane prepolymers used to make polyurethane foams, and more specifically, urethane prepolymers used to make water absorbent polyurethane and high water capacity foams.

2. Description of Prior Art

The prior art discloses various compositions and methods used to make polyurethane prepolymers and water absorbent polyurethane foams resulting from such prepolymers. Recently, there have been attempts to achieve highly water absorbent foams which also exhibit dimensional stability, e.g. ability to retain shape and rigidity, and hold the absorbed water even under pressure. See *Non Wovens Market and Fiber Structures Report*, p. 3, July 14, 1989. This ability to retain water under pressure also reflects the foam's load bearing characteristics. Further, materials possessing these characteristics have also been recognized as useful in products such as surgical dressings, diapers, bedpads, etc. See U.S. Pat. No. 3,939,123 to Matthews et al, Col. 1, lines 13–23.

One known method for making prepolymers for water absorbent foams is to make the prepolymer with hydrophilic components such as polyoxyethylene oxide containing polyols. See U.S. Pat. No. 3,903,232 to Wood and Frisch. However, when wet, such foams undergo a large amount of swelling and water plasticization of the polymer matrix. Further, Wood and Frisch disclose that they can compress their foams to form soft dense materials and upon exposure to water, regenerate them to the original volume, e.g. fifteen to twenty times expansion. See Column 2, lines 38–42 and lines 52–57. Because of this expansion and the accompanying swelling and plasticization, the Wood et al foams lose their structural rigidity and release substantial amounts of water when handled. Thus their ability to hold water is diminished. Also see U.S. Pat. No. 4,160,076. (hydrophilic polyurethane sponge which absorbs six times its weight in water).

More recent methods achieve a water absorbent foam by incorporating hydrophilic components into the prepolymer. For instance, U.S. Pat. No. 4,738,992 to Larson and Hedrick discloses the incorporation of ionic hydrophilic functional groups, such as sulfonate groups, into a polyurea/urethane, isocyanate terminated prepolymer used to make water absorbent sponges. Of course, the hydrophilicity of the functional groups enhances the overall water absorption properties of the foam. See also U.S. Pat. No. 4,638,017 to Larson and Hedrick.

The addition of hydrophilic polycarbonyl moieties, e.g. those found on acrylates, to the polyurethane structure of a foam represents a similar approach to Larson and Hendrick's method. See U.S. Pat. No. 4,725,628 to Garvey et al. See also U.S. Pat. No. 4,725,629 to Garvey and Pazos.

Water absorbent foams also have been made using hydrophobic materials. For instance, U.S. Pat. No. 4,377,645 to Guthrie and Arquette discloses foaming prepolymers wherein isocyanate capped prepolymers are prepared from hydrophobic methylene diphenyl isocyanate, (MDI), trimethyolpropane and a polyoxyalkylene diol. While the foam resulting from the MDI terminated prepolymer only swells 19% by volume, it is only able to hold a little over 20 times its weight in water. These foams are suitable for household sponges and substrates for flocked wall coverings, as well as suitable for flexible foams used in medical or personal care items. See also U.S. Pat. Nos. 4,384,050 and 4,384,051 to Guthrie.

To enhance a foam's dimensional stability, additives have been used in making water absorbent foams. Typically, additives are also used to improve the durability and the load bearing characteristics of the foam. A popular method for achieving these characteristics is the addition of reinforcing agents. For instance, U.S. Pat. No. 4,314,034 to Fulmer and Vollmerhausen discloses the addition of polyester fibers to provide structural rigidity. See also U.S. Pat. No. 4,201,846 to Kehr et al. (polyvinyl alcohol fibers used for reinforcement in polyurethane foams) and U.S. Pat. No. 3,959,191 to Kehr and Marans (addition of solid materials such as fibrous materials to improve load bearing characteristics.)

However, the prior art approaches for achieving water absorbency and dimensional stability have disadvantages. For example, the super absorbent foams disclosed by Larson and Hedrick are made by the attachment of ionic groups to the urethane prepolymer and thus involves additional chemical processing to achieve the desired water absorbent properties. Garvey et al's use of the methacrylates results in foams which undergo undue swelling when wet.

The foams made from MDI and reinforcing agents, have relatively good structural stability, but do not have sufficient water capacity characteristics because the reinforcing agents increase foam density and deplete void space. As mentioned above, MDI-based foams without reinforcing agents were only able to hold water in an amount up to about twenty times their weight.

SUMMARY OF THE INVENTION

Accordingly, it is an object of the invention to obtain foams having improved water capacity properties.

It is also an object of this invention to obtain a foam which holds water under pressure.

It is an object of the invention to obtain foams with improved water absorbent properties, yet which undergo relatively little swelling.

It is an object of the invention to provide a novel method to produce water absorbent foams.

It is also an object to produce a novel water absorbent foam composition as well as an object to use the novel foams in articles of manufacture which require good water absorbent and wicking properties, as well as structural stability. These and other objects will be apparent from the following description.

DESCRIPTION OF PREFERRED EMBODIMENTS

Prepolymers used to make the invention are prepared using the well known prepolymer approach and can be made with polyoxyethylene containing diols and particular polyisocyanates. Crosslinking agents are also used to make the prepolymer. The resulting prepolymer is then foamed in water and surfactants.

The polyoxyethylene containing diols used are those having an average molecular weight, i.e. number average, of 2500 or less. The diol should also have at least 50%, preferably 80% and most preferably substantially 100% by weight, oxyethylene groups. By using a diol with higher oxyethylene content, hydrophilicity and, ultimately, good water absorption is maintained. A preferred diol is a polyoxyethylene diol from Union Carbide which has a molecular weight of between about 950 and 1050 and is commercially available as Carbowax 1000. However, other polyethylene glycol formulations having higher or lower molecular weights can also be used.

As mentioned earlier, when a diol such as Carbowax 1000 is used, a crosslinking agent is required to provide sufficient crosslinking and strength to the final foam. Typical crosslinking agents include low molecular weight polyols having 3 or 4 hydroxyl equivalents per mole. Examples are trimethylolethane, trimethylolpropane, glycerol, triethanolamine, pentaerythritol or mixtures thereof. The preferred crosslinking agent is trimethylol propane (TMP). In general the molar ratio of diol to TMP should be in the range of about 1:1 to 4:1, with the preferred ratio being about 2:1 to 3:1. Of course, the higher the molecular weight diol used, the more crosslinker needed to get the proper crosslinking. By using the crosslinking agent in these proportions, sufficient hydroxyl equivalents are present for reaction with the isocyanate function groups of the polyisocyanates. Thus, the addition of the crosslinking agent to the diol and the polyisocyanate provides a prepolymer which has a number of branches and terminal isocyanates. The resulting terminal isocyanate groups are thus present in sufficient numbers to provide a relatively strong crosslinked foam.

The preferred isocyanate is methylene bis(cyclohexyl isocyanate) and is available as Desmodur® W from Mobay, Corp. However, other similar isocyanates are envisioned and could be used for this invention.

The polyol component, i.e. the diol and hydroxyl containing crosslinking agent, and the polyisocyanate component are preferably mixed at a ratio of about 1:1 by weight.

Catalysts can also be used to make the prepolymer. Examples include organo tin compounds such as stannous octoate, stannous oleate, dibutyltin dilaurate, dibutyltin di-2-ethyl hexoate and the like. Tertiary amine catalysts such as triethyl amines may also be used. Such catalysts are disclosed in *Flexible Polyurethane Foams: Chemistry and Technology;* Woods, pp. 50–55, 1982, the contents of which are incorporated herein by reference. The amount of catalyst employed varies between 0.0005% and to about 0.1% by weight of catalyst to the weight of all components of the prepolymer, i.e. polyol, crosslinking agent and polyisocyanate.

The prepolymer is formed, using the above mentioned proportions, at a temperature in the range of 50° C. to about 90° C. and a residence time in the range of 0.5 h to 48 h, depending on the amount and type of catalyst used. Preferably the reaction is maintained at about 70° C. throughout the reaction.

Further, during the prepolymer forming reaction, it has been helpful to measure the isocyanate level by titration periodically during the reaction. From these periodic measurements, one can determine the theoretical point at which all the hydroxyl groups of the polyol (and crosslinking agent) will have reacted with an isocyanate. If the theoretical point has not been reached, additional reaction time will be required. However, if the reaction is carried out too far, the viscosity of the resulting prepolymer increases to the point where it becomes difficult to mix the prepolymer with water.

After the prepolymer is made, it is added to water to produce the foam. Surfactants can also be added to adjust the texture and appearance of the foam, i.e. such as the cell size, shape, etc., as well as preventing the formation of splits in the resulting foam buns. Examples of surfactants include silicone-polyether copolymer surfactants such as L-520 from Union Carbide and DC-198 from Dow Corning. Fluorocarbon copolymers such as the Zonyl® (from Dupont) or Fluorad® (from Minnesota Mining and Manufacturing) surfactant families can also be used. The polyether silicones are preferred when water absorbent foams containing small, fine cells are desired.

Polyoxyethylene/polyoxypropylene block copolymer surfactants such as Pluronic® surfactants can also be used. The preferred Pluronic surfactants, e.g. L-62, L-92 and L-122, contain 20 percent by weight or less of polyoxyethylene and are preferably employed in 1-2% solution, the use of which is well known to one skilled in the art of foam formation.

It is also often desirable to add about 0.5 to 2.0% by weight of an inorganic base to catalyze the foaming reaction for aliphatic isocyanate-based prepolymers. Sodium bicarbonate or sodium carbonate are two examples of such catalysts.

The prepolymer and surfactant containing aqueous solution are then mixed in a high shear mixer in a volume amount ratio of prepolymer:water of about 2:1 to 6:1, with a ratio of about 3:1 preferred.

The resulting foams typically have a low density and have been shown to be water absorbent. While the density of the foams obtained have been in the range of 0.020 g/cc to 0.060 g/cc, higher density foams should also show good water absorbency.

The foams demonstrate high water absorbency as measured by vertical wicking rates of up to about 3 cms in one minute. The capillary wicking tests used are similar to those used to measure vertical wicking in paper products, e.g. the well known Klemm test. The wicking results for the foams tested are found in Table I.

The water capacities of the foams are found in Table II and are expressed as the amount(s) of water absorbed per gram of foam. As indicated by the results in Table II, the invention shows improved water capacity than that of prior art foams, e.g. improvements of up to two times as much capacity. Examples F and G also indicate improvements in water absorption properties, e.g. wicking.

The foam's dimensional stability is evidenced by its load bearing characteristics and rigidity when wet; i.e. it does not collapse under its own weight as well as the weight of the water. Further when wet, the foam transforms from a flexible structure to one that is quite firm and undergoes only a relatively small amount of swelling after complete saturation.

In addition, after it has been wetted and water has been absorbed, the foams show the ability to retain a substantial amount of water, even under pressure. See Table III.

In view of the above properties, it is envisioned that the invention can be used in various personal and medical care areas. Personal products include incontinence pads, tampons, sweat bands, household sponges, etc. Medical care products include surgical sponges, wound dressings, surgical drapes, mattress covers, etc.

The following examples illustrate the basic concepts of the invention, but are in no way to be used to limit the scope of the claims below.

EXAMPLE A

Prepolymer 1 (P1)

A mixture of 500 g (0.5 moles) of Carbowax 1000 and 33.5 g (0.25 moles) of trimethylolpropane was degassed by heating for two hours 70° C. and about 2 Torr. To this was added 542 g (2.07 moles, 18% excess) of Desmodur W, i.e. methylene bis(cyclohexyl isocyanate). The temperature was raised to 70° C. and 0.5 g of stannous octoate was added as catalyst. After 35 minutes, the isocyanate content of the reaction product was 2.19 meq/g and the product was poured into a bottle for storage. After a few days at ambient temperature, the isocyanate content and viscosity had stabilized at 2.00 meq/g and 73,000 cp at 25° C.

EXAMPLE B

Foam 1 (F1)

A foam was made from P1 by mixing 100 g of P1 with 33 g of water containing 1.6 g of sodium bicarbonate and 0.7 g of Dow Corning's polyether-polysiloxane surfactant DC-198. The dried foam had a fine-celled structure and a density of 0.037 g/cc. After soaking in water, the foam contained approximately 35 times its weight of water and its volume had swelled by 50%. Upon application of 0.2 psi, the foam retained 34g water per gram of foam. See Tables II and III.

EXAMPLE C

Prepolymer 2 (P2)

In another illustration, three batches of a prepolymer were made by mixing 1000 g (1.0 mole) of Carbowax 1000 and 67.0 g (0.5 mole) of trimethylolpropane and degassed as in the previous example. To this mixture was added 1084 g (4.14 moles) of Desmodur W, the temperature was raised to 70° C. and 1.0 g of stannous octoate was added. Of the several preparations made, each had an isocyanate content of 2.15-2.25 meq/g at the completion of the reaction. The products were poured into bottles for storage as described in Example A.

EXAMPLE D

Foam 2 (F2)

Approximately two quarts of P2 were loaded into the "prepolymer (isocyanate) side" of a UNIPRE Type M-10/2 two-component meter, mix, and disperse system equipped with two five-liter stainless steel tanks, each tank connected to a metering pump drive unit controlled by two separately adjustable electric motors driving independent metering pumps, connected by means of teflon-lined hoses to a high capacity mixing head containing a high-shear dynamic mixer containing a rotor and stator. (Ashby-Cross Co., Inc., Topsfield, MA). Approximately two quarts of an aqueous solution containing two wt% Pluronic L-62 surfactant and 2% sodium bicarbonate was used. By a computer controlled metering system a 3:1 (volumetric) ratio of prepolymer-to-aqueous was metered through the mix head and into an open container, where the foaming reaction proceeded. The dry foam had a density of 0.030 g/cc and had a very fine celled structure composed primarily of open cells. Immersion of the foam into an aqueous saline solution led to sinking of the foam into the water and an immediate retention of 38–40 g saline solution/g polymer-foam in three different samples. A volume expansion of about 40% was observed after immersion. After gentle application and releasing of pressure on the foam while submerged in water, the samples of foam were able to hold 41–45 g of water per gram of foam. Upon application of 0.2 psi, 40–43 g of water per gram of foam remained and upon application of 1 psi 22 g–29 g of water per gram of foam remained. See Tables II and III.

EXAMPLE E

Foam 3 (F3)

P2 was again used to make a foam except an aqueous phase of 2% Pluronic L62 and 2% sodium bicarbonate and a 2:1 volumetric ratio of prepolymer:aqueous as controlled by the computer was used. When dry, the foam had a density of 0.050 g/cc and a higher portion of open cells than the foam of Example D, e.g. F2. After submersion the foam contained 31 g of water per gram of foam. At 0.2 psi the foam retained 30–31g of water per gram of foam. This foam exhibited vertical wicking of saline solution of 2.0–2.7 cm in 1 minute, 4.7–5.2 cm in 20 minutes, and 8 cm in three hours.

EXAMPLE F

A piece of the foam (C1), e.g. a foam produced according yo Example 7 of U.S. Pat. No. 4,377,645, weighing 2.6 g was allowed to float on water for one day. It was observed that only the bottom surface was wet and that no wicking had occurred in the foam's interior. The foam was then compressed under water to expel as much air as possible. The foam was then removed from the water and allowed to drain for five minutes. It was reweighed and was found to hold 23.4 g of water per gram of foam (See Table III) and was observed that the foam had become soft. It was also observed that the foam had expanded 19% in volume. When squeezed, it released the water easily due to the softness of the foam, but required several minutes to return to its original wet dimensions because of its lack of resilience in the wet state.

EXAMPLE G

A prepolymer produced according to Example 1 of U.S. Pat. No. 4,377,645 was converted into a foam (C2) by mixing the prepolymer on an Ashby-Cross Foam Machine with an equal volume of water containing 2% by weight of Pluronic 25-R2 as a surfactant. After drying, the foam had a density of 0.047 g/cc and has cells somewhat smaller than C1 of Example F. A piece of the resulting foam weighing 2.6 g of floated on water and required three hours to become saturated. It held 22.8 g of water per gram of foam (See Table III) and its volume expanded by 19%. When wet, C2 was much like C1, but C2 was somewhat harder to squeeze because of its finer cell structure. Recovery of original dimensions required even more time to return to its original dimensions than C1.

TABLE I

| Foam | Water Absorbency Wicking Height (cm) | Elapsed Time (min) |
| --- | --- | --- |
| F2 | 1.2 | 1 |
|  | 2.4 | 20 |
| F3 | 2.0–2.7 | 1 |
|  | 4.7–5.2 | 20 |

TABLE I-continued

| Foam | Water Absorbency | |
|---|---|---|
| | Wicking Height (cm) | Elapsed Time (min) |
| | 8.0 | 180 |

TABLE II

| Foam | Water Capacity (0 psi) (g water/g foam) |
|---|---|
| F1 | 35 |
| F2 | 41–45 |
| F3 | 31 |
| C1 | 23 |
| C2 | 23 |

TABLE III

| Foam | Pressure | Water Retention g water/g foam |
|---|---|---|
| F1 | 0.2 | 34 |
| F2 | 0.2 | 40–43 |
| F2 | 1.0 | 22–29 |
| F3 | 0.2 | 30–31 |

We claim:

1. A water absorbent polyurethane foam derived from a prepolymer prepared from
    (a) a diol consisting essentially of polyoxyethylene and having a molecular weight of about 2500 or less, wherein the diol contains at least about 50% by weight oxyethylene units and
    (b) a crosslinking agent comprising a low molecular weight polyol having 3 or 4 hydroxyl equivalents per mole, and
    (c) methylene bis(cyclohexyl isocyanate), wherein said foam possesses a water capacity of about 30–50 g of water per gram of foam and retains substantial amounts of water under pressure.

2. A foam according to claim 1 wherein the diol contains at least 80% by weight polyoxyethylene.

3. A foam according to claim 1 wherein the diol contains substantially 100% by weight polyoxyethylene.

4. A foam according to claim 1 wherien the crosslinking agent is trimethyolproprane.

5. A foam according to claim 3 wherein the polyoxyethylene-containing diol is polyethylene glycol.

6. A foam according to claim 3 wherein the foam has a density in the range of about 0.020 g/cc to 0.040 g/cc.

7. A foam according to claim 1 wherein the foam has a water capacity of about 30–50 g of water per gram of foam.

8. A foam according to claim 1 wherein the foam absorbs water to a vertical wicking height of about 1.2 cm in one minute and about 2.4 cm in twenty minutes.

9. A foam according to claim 1 wherein the foam absorbs water to a vertical wicking height in the range of about 2.0–2.7 cm in one minute, in the range of about 4.7–5.2 cm in twenty minutes and about 8 cm in three hours.

10. A foam according to claim 1 wherein the foam retains in the range of about 30–50 grams of water per gram of foam under 0.2 psi.

11. A foam according to claim 1 wherein the foam retains about 20–30 g of water per gram of foam under 1.0 psi.

12. A process for making water absorbent foams comprising:
    (a) reacting (i) a polyol component comprising a diol consisting essentially of polyoxyethylene, having a molecular weight of about 2500 or less, and wherein the diol contains at least about 50% by weight oxyethylene units and a crosslinking agent comprising a low molecular weight polyol having 3 or 4 hydroxyl equivalents per mole with (ii) an isocyanate component comprising methylene bis(cyclohexyl isocyanate) to form a prepolymer and
    (b) then reacting the prepolymer prepared in (a) with water to form said foam, wherein the foam has a water capacity of about 30–50 g of water per gram of foam.

13. A process according to claim 12 wherein the polyol component (i) and the isocyanate component (ii) are reacted at a ratio by weight of about 1:1.

14. A process according to claim 12 wherein the crosslinking agent is added at a diol:crosslinking agent ratio molar of about 1:1 to 4:1.

15. A process according to claim 14 wherein the ratio is about 2:1 to 3:1.

16. A process according to claim 12 wherein the crosslinking agent is trimethylolpropane.

17. A process according to claim 12 wherein the polyoxyethylene containing polyol is polyethylene glycol.

18. A process according to claim 12 wherein a foaming catalyst is used in step (b).

19. A process according to claim 18 wherein the foaming catalyst is sodium bicarbonate.

20. A process according to claim 12 wherein in addition a surfactant is added in the foam forming step (b).

21. A process according to claim 12 wherein in addition a catalyst is added to make said prepolymer in step (a).

22. A process according to claim 21 wherein the catalyst is an organo-tin catalyst.

23. A process according to claim 21 wherien the catalyst is stannous octoate.

24. An article of manufacture containing a water absorbent polyurethane foam derived from a prepolymer prepared from
    (a) a polyoxyethylene containing diol consisting essentially of polyoxyethylene, having a molecular weight of about 2500 or less, and containing at least about 50% by weight of oxyethylene units;
    (b) a crosslinking agent comprising a low molecular weight polyol having 3 or 4 hydroxyl equivalents per mole; and
    (c) methylene bis(cyclohexyl isocyanate); wherein said foam possesses a water capacity of about 30–50 grams of water per gram of foam and retains substantial amounts of water under pressure.

25. An article according to claim 24 wherein said foam has a density in the range of 0.020 g/cc to 0.040 g/cc.

26. An article according to claim 24 wherein said foam absorbs water to a vertical wicking height of about 1.2 cm in one minute and 2.4 cm in about twenty minutes.

27. An article according to claim 24 wherein said foam absorbs water to a vertical wicking height of about 2.0 to 2.7 cm in one minute, about 4.7 to 5.2 cm in twenty minutes and about 8.0 cm in about three hours.

28. An article according to claim 24 wherein said foam retains in the range of about 30–50 grams of water per gram of foam under 0.2 psi.

29. An article according to claim 24 wherein said foam retains in the range of about 20–30 grams of water per gram of foam under 1.0 psi.

30. A method for improving the ability of a polyurethane foam, or articles containing a polyurethane foam, to retain under pressure substantial amounts of water and to increase said foam's or article's capacity for water, wherein the method comprises preparing the polyurethane foam from:
  (a) diol consisting essentially of polyoxyethylene and having a molecular weight of about 2500 or less wherein the diol contains at least about 50% by weight oxyethylene units; and
  (b) a crosslinking agent comprising a low molecular weight polyol having 3 or 4 hydroxyl equivalents per mole; and
  (c) methylene bis(cyclohexyl isocyanate);
wherein said foam possesses water capacity of about 30–50 g of water per gram of foam and retains substantial amounts of water under pressure.

31. A method according to claim 30 wherein the diol component (a) and the crosslinking agent (b) are reacted with the isocyanate component (c) at a ratio :(c) by weight of about 1:1.

32. A method according to claim 30 wherein the crosslinking agent (b) is added at a molar ratio (a):(b) of about 1:1 to 4:1.

33. A method according to claim 32 wherein the ratio is about 2:1 to 3:1.

34. A method according to claim 30 wherein the crosslinking agent is trimethylolpropane.

35. A method according to claim 30 wherein the polyoxyethylene containing diol is polyethylene glycol.

36. A method according to claim 30 wherein said foam has a density in the range of 0.020 g/cc to 0.040 g/cc.

37. A method according to claim 30 wherein said foam retains in the range of about 30–50 grams of water per gram of foam under 0.2 psi.

38. A method according to claim 30 wherein said foam retains in the range of about 20–30 grams of water per gram of foam under 1.0 psi.

* * * * *